Dec. 24, 1929.　　　A. PRABELL　　　1,740,999
MULTIPLE PAN STRUCTURE
Filed Sept. 13, 1928
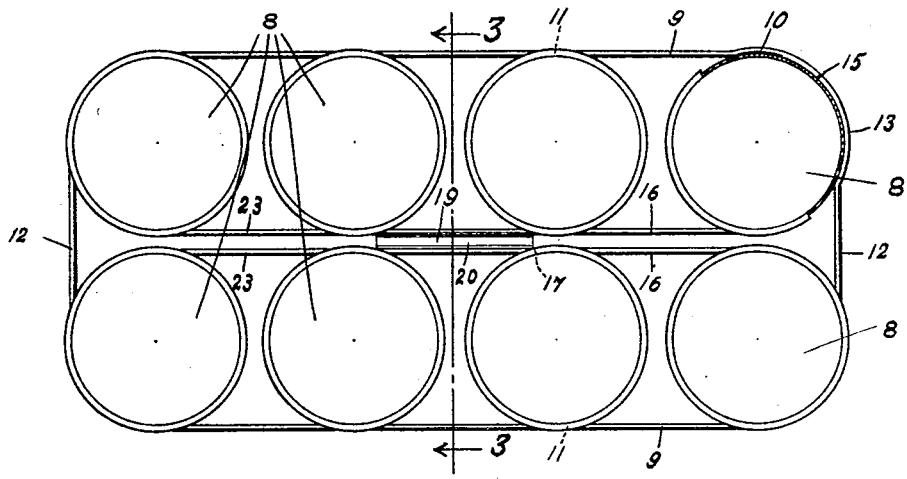
Fig. 1.
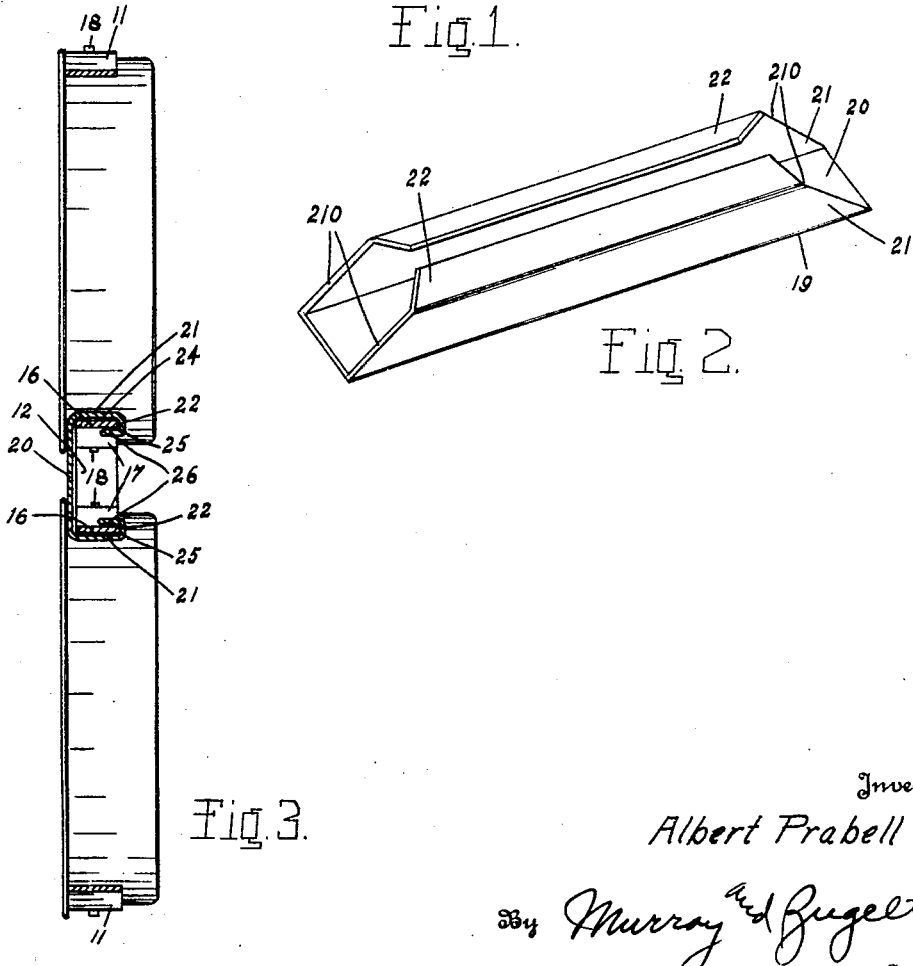
Fig. 2.
Fig. 3.
Inventor
Albert Prabell
By Murray and Bugelter
Attorneys Patented Dec. 24, 1929

1,740,999

UNITED STATES PATENT OFFICE

ALBERT PRABELL, OF BELLEVUE, KENTUCKY, ASSIGNOR TO LOCKWOOD MANUFACTURING COMPANY, OF CINCINNATI, OHIO, A CORPORATION OF OHIO

MULTIPLE-PAN STRUCTURE

Application filed September 13, 1928. Serial No. 305,762.

This invention relates to multiple pan units and especially to a combined brace and spacer element for use in such structures.

An object of the invention is to provide a spacer element which is exceedingly simple in construction and one which is correspondingly inexpensive of manufacture and application.

Another object is to provide a sheet metal brace and spacer element which is conveniently attached to the tying straps of the pan unit.

Another object is to provide a pan unit wherein any suitable number of pans may be uniformly spaced from one another in all directions and which is furthermore of greater than usual rigidity.

Another object is to provide a multiple pan unit which is characterized by a reduction of tying elements and increased in strength and rigidity.

These and other objects are attained by the means described herein and disclosed in the accompanying drawings, in which:

Fig. 1 is a top plan view of a pan unit of the invention.

Fig. 2 is a perspective view of a brace of the invention.

Fig. 3 is a view taken on line 3—3 of Fig. 1.

In the present embodiment the pan unit is described as comprising a plurality of circular pans 8 symmetrically arranged and uniformly spaced in all directions. The present invention is disclosed in such embodiment because units embodying circular pans present greater difficulties in providing the strength necessary to resist hard usage. It will be understood therefore that the invention is not confined to units made up of pans of any particular shape.

The circular pans 8 are joined by a longitudinal pair of straps 9 each of which has an arcuate portion 10 formed at its opposite ends for embracing the side walls of the endmost pans. The straps 9 are furthermore provided intermediate their ends with suitable arcuate bends 11 for embracing the side walls of the intermediate pans. The end straps 12 have arcuate portions 13 at their opposite ends embracing and secured to the side walls of the pans and substantially abutting the arcuate portions 10 as at 15. It will be noted that the straps 9 and 12 embrace the pan unit. A pair of interior straps 16 are each provided with a series of suitable arcuate portions 17 into which the innermost wall portions of each pan may seat. Rivets such as 18 may be used throughout for securing the side walls of the pans to the respective arcuate portions 10, 11, 13 and 17. The combined brace and spacer 19 is of a general channel shape comprising a base 20, side walls 21 extending at substantially a right-angle thereto and a pair of formable flanges 22 extending from the edges of the side walls 21. The length of the member 19 extends substantially between two adjacent pans 8 and the ends 210 of the side walls 21 are tapered toward one another so as to facilitate clamping the brace on the straps 19. In a unit such as is shown one of the braces 19 is positioned over both of the interior straps 16 so that the top edges 23 abut the inner face of the base 20 of brace 19. The inner faces of walls 21 are in substantial abutment with the sides 24 of straps 16. The flanges 22 are then turned about the opposite edges 25 of straps 16 so that the ends 26 of said flanges and the side walls 21 firmly clamp the straps 16 in pre-determined spaced relation. Thus the member 19 serves to preclude movement of the straps 16 toward and away from one another and at the same time covers the sharp edges of those straps. It should be noted that forces acting against either the ends or the sides of the unit tend not only to distort the outer strap structure but to separate or push together inner straps 16. Therefore the member 19 serves to render the entire supporting strap structure more rigid and to preclude distortion thereof which might otherwise result from stresses and strains and shocks due to hard usage.

A further advantage of this structure lies in the fact that in addition to supporting the unit against stresses and strains directed in substantially the plane of the pan unit, the brace precludes bending or warping of the unit so that regardless of the abuse which the unit may receive, every pan will have its bottom disposed in a common plane.

What is claimed is:

1. A plan unit structure comprising a plurality of rows of pans, means comprising straps extending along the exterior of the pans and secured thereto, a pair of straps secured one each to the rows of pans and a metallic brace and spacer element extending across the pair of straps at the top edges thereof and extending along the remote sides of said straps and having the ends inwardly turned and individually embracing the remaining edges and sides of the straps.

2. A pan brace structure comprising a pair of substantially flat straps, a U-shaped member comprising arms and flanges on the free ends of the arms, the flanges being turned about certain edges of the straps for precluding relative movement of the straps in all directions.

3. A pan unit structure comprising a plurality of rows of pans arranged in spaced relation between the rows, the rows being similarly spaced, exterior strap means surrounding the pans and secured to the exteriorily disposed pans of the group, a pair of straps secured one each to adjacent rows of pans and brace means jointly and severally embracing said pair of straps, and precluding movement of the straps relative to one another in any direction and serving to strengthen the unit as a whole and to retain the individual pans in a predetermined plane.

4. In combination a plurality of pans arranged in spaced rows, substantially parallel straps secured to adjacent walls of the pans in adjacent rows, an exterior binding strap structure surrounding the pans and unitary formed sheet metal means embracing the parallel straps precluding lateral separation and furthermore having means precluding approach of said straps toward one another.

5. In combination with a pair of rows of spaced pans, of a pair of interior parallel brace straps secured one each to adjacent sides of adjacent rows of pans and a combined metal brace and handle member embracing the pair of parallel straps and precluding relative movement of the straps in all directions.

6. A pan unit structure comprising a plurality of circular pans uniformly spaced from one another whereby to provide longitudinal and transverse rows of pans, exterior strap units having arcuate bends therein at spaced intervals to receive exterior wall portions of the pans, a pair of parallel longitudinally extending straps disposed between adjacent longitudinal rows of pans and having arcuate bends therein for receiving and positioning the pans, means to secure the pans to the several straps and means extending between adjacent pans in the longitudinal rows and embracing the parallel straps to preclude movement of said straps relative to one another.

7. As a new article of manufacture a brace structure for multiple pan units comprising an elongated piece of sheet metal arranged in substantially a channel shape and having parallel flanges, the edges of which are turned inwardly and are bendable upwardly for embracing spaced parallel elements.

8. A pan unit structure comprising a plurality of pans uniformly spaced from one another to provide longitudinal and transverse rows of pans, exterior strap means contacting the outermost portions of the said plurality of pans as a group, a pair of parallel longitudinally extending straps extending between adjacent rows of pans, a single means to secure the pans to the straps and means extending between adjacent pans in the longitudinal rows and jointly and severally embracing the parallel straps to preclude movement of the straps relative to one another.

In testimony whereof, I have hereunto subscribed my name this 6th day of September, 1928.

ALBERT PRABELL.